United States Patent
Kishi et al.

(10) Patent No.: US 7,187,593 B2
(45) Date of Patent: Mar. 6, 2007

(54) CONTROL SYSTEM; CONTROL APPARATUS; STORAGE DEVICE AND COMPUTER PROGRAM PRODUCT

(75) Inventors: Nobuya Kishi, Yamatokoriyama (JP); Yukari Ebi, Souraku-gun (JP); Takaya Nakatani, Habikino (JP); Yosuke Kashu, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 11/095,977

(22) Filed: Mar. 30, 2005

(65) Prior Publication Data

US 2005/0219899 A1  Oct. 6, 2005

(30) Foreign Application Priority Data

Mar. 30, 2004  (JP)  ............................. 2004-101213

(51) Int. Cl.
*G11C 7/10*  (2006.01)
(52) U.S. Cl. ........................... 365/189.04; 365/189.01; 365/218
(58) Field of Classification Search ........... 365/189.04, 365/189.01, 218
See application file for complete search history.

(56) References Cited

U.S. PATENT DOCUMENTS 6,421,279 B1 * 7/2002 Tobita et al. .......... 365/189.01

FOREIGN PATENT DOCUMENTS

| JP | 63-018580 | 1/1988 |
| JP | 05-205285 | 8/1993 |
| JP | 09-284572 | 10/1997 |
| JP | 2000-305717 | 11/2000 |

* cited by examiner

*Primary Examiner*—Anh Phung
*Assistant Examiner*—Pho M. Luu
(74) *Attorney, Agent, or Firm*—Edwards Angell Palmer & Dodge LLP

(57) ABSTRACT

A reading/writing process control unit for instructing a reading/writing process and an erasing process control unit for instructing an erasing process are provided separately and each is connected with two HDDs via a switch. While the reading/writing process control unit is connected with one HDD and executing a reading/writing process, a switch is controlled to connect the erasing process control unit with another HDD to erase data of the HDD connected with the erasing process control unit. Since it is enabled to execute a data reading/writing process and a data erasing process for a storage device in parallel for different HDDs, lowering of the access rate as a whole can be prevented.

23 Claims, 11 Drawing Sheets

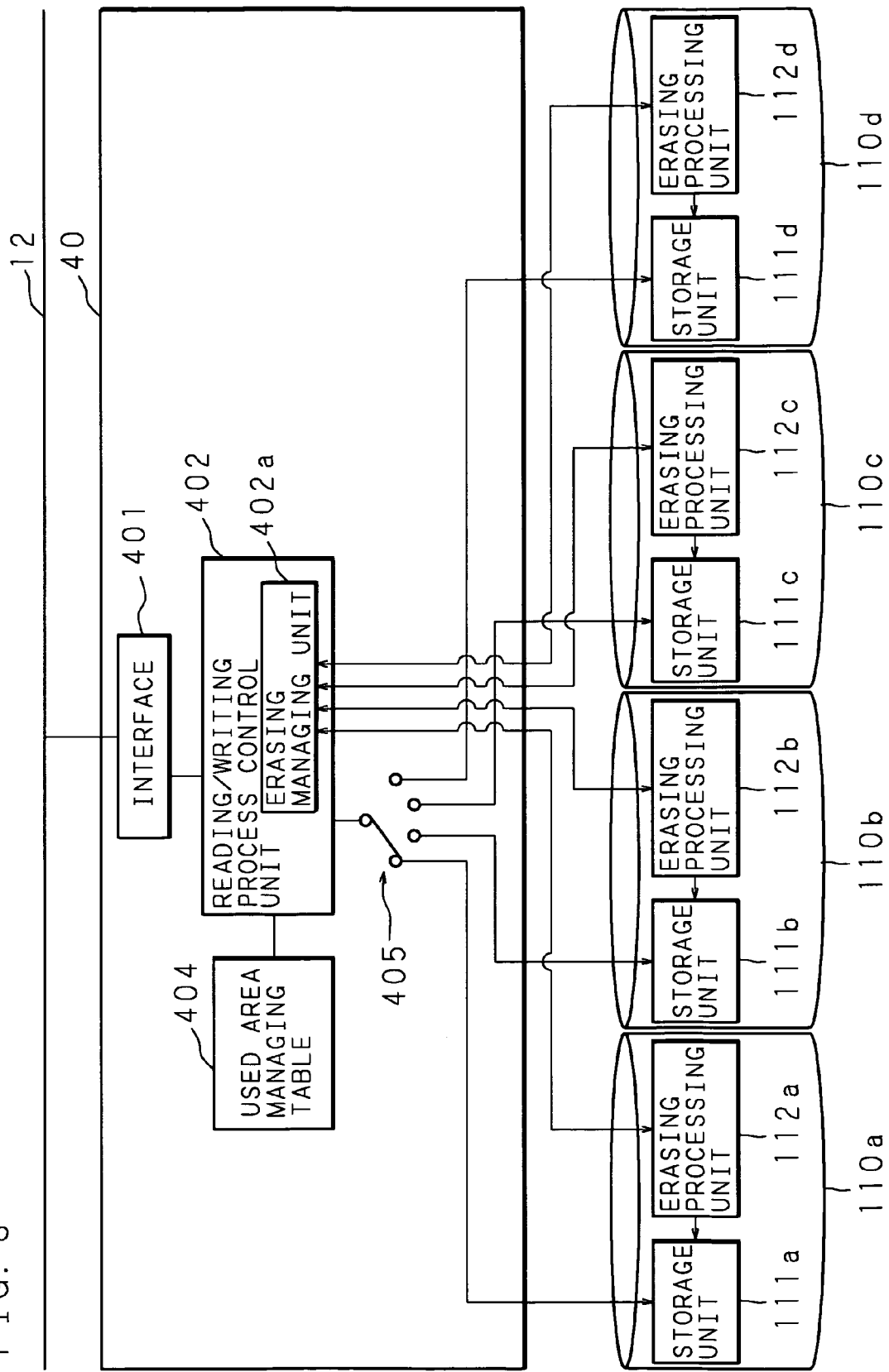

CONTROL SYSTEM; CONTROL APPARATUS; STORAGE DEVICE AND COMPUTER PROGRAM PRODUCT

CROSS-REFERENCE TO RELATED APPLICATIONS

This Nonprovisional application claims priority under 35 U. S. C. §119(a) on Patent Application No. 2004-101213 filed in Japan on Mar. 30, 2004, the entire contents of which are hereby incorporated by reference.

BACKGROUND OF THE INVENTION

1. Field of the Invention

The present invention relates to: a control system for performing a data reading/writing process for one storage device while performing a data erasing process for another storage device simultaneously and in parallel by switching the connection status between a plurality of storage devices and a control apparatus; a control apparatus and a storage device to be used in such a control system; and a computer program product for such a control system.

2. Description of Related Art

An image forming apparatus such as a digital multi function printer for temporarily storing electronic document data in a storage unit thereof and processing the data is widely used. A digital multi function printer comprises a scanner for reading an original image and a printer unit for forming an image on a paper, and has a plurality of functions such as a copying function, a facsimile function, a scanner function and a printing function. Such a digital multi function printer proposes to the user advancement of availability and performance when being located on a communication network as a data processing device for efficiently processing data inputted from a plurality of interfaces. A digital multi function printer is also equipped with a mass storage device such as a hard disk for enabling rapid processing of various mass data, so that a plurality of data process requests can be accepted and data can be sequentially processed.

In such a storage device such as a hard disk, data is temporarily written and held for processing. When data is newly inputted after completion of the process, data which has been already processed is erased by overwriting meaningless data to accept new data. Accordingly, there is a problem from the perspective of data protection since data which has been processed is let stand in the device until new data is written. In these circumstances, a device which erases and invalidates data which has been processed has been invented in recent years in order to avoid data from being let stand in the device (for example, see Japanese Patent Application Laid-Open No. 9-284572 (1997)).

Regarding an image forming apparatus or the like equipped with a storage device for repeatedly and sequentially performing a data writing process and a data erasing process as described above, it is required to enhance the access rate of the storage device in order to enhance the performance of the entire system. Proposed as technology for enhancing the access rate of the storage device are: a device using a disk array device constructed with the RAID (Redundant Arrays of Inexpensive Disks) in conjunction with a write cache (see Japanese Patent Application Laid-Open No. 2000-305717); and a device for enhancing the access rate by equipping the hard disk itself with a plurality of heads (see Japanese Patent Application Laid-Open No. 63-18580 (1988) and Japanese Patent Application Laid-Open No. 5-205285 (1993)).

However, the device disclosed in Japanese Patent Application Laid-Open No. 2000-305717, which has only one means for accessing a disk in the device, has a problem that it is required to prioritize any one access over the other when an access by a normal reading process and a normal writing process and an access for a data erasing process are made simultaneously and lowering of the entire apparent disk access rate cannot be prevented.

Moreover, the device disclosed in Japanese Patent Application Laid-Open No. 63-18580 (1988), which has a commonly used bus to be connected with the hard disk and the system, has a problem that an access for a reading process and a writing process collides with an access for an erasing process at the bus portion and lowering of the disk access rate cannot be prevented.

Moreover, the device disclosed in Japanese Patent Application Laid-Open No. 5-205285 (1993), which has two heads at a disk and one bus for one head, can make an access for a reading process and a writing process and an access for an erasing process with different heads, so that no collision arises between the two accesses. However, such a device has a problem that it is expensive since a hard disk having two heads and two buses is a specialized disk.

BRIEF SUMMARY OF THE INVENTION

The present invention has been made with the aim of solving the above problems, and it is an object thereof to provide: a control system capable of erasing data in a storage device without causing lowering of access rate even when a conventional storage device is used; a control apparatus and a storage device to be used for such a control system; and a computer program product for such a control system.

The present invention, to put it briefly, is constructed in a manner that a plurality of storage devices capable of performing a data reading/writing process and an erasing process are connected with a control apparatus for controlling these storage devices and the control apparatus judges whether each storage device is under executing a reading/writing process or not so as to cause a storage device which is not under executing a reading/writing process to execute a data erasing process. It should be noted that the control apparatus and the storage devices are connected with each other via a switch capable of switching the connection statuses so that a storage device which performs a data reading/writing process and a storage device which performs a data erasing process are connected with the control apparatus via different paths. Such switching of the connection statuses enables a storage device which performs a data reading/writing process and a storage device which performs a data erasing process to be controlled separately, so that both processes can be executed in parallel for the different storage devices. Accordingly, even when a conventional storage device is used, data in a storage device can be erased without causing lowering of the access rate.

A control system according to the present invention is a control system for controlling a data reading/writing process and a data erasing process for a storage device, characterized by including: a plurality of storage devices; a reading/writing process control unit which comprises a first connection switching unit for switching a connection status between the reading/writing process control unit and the plurality of storage devices, and controls the first connection switching unit to execute a data reading/writing process for any one of the plurality of storage devices that is connected with itself; and an erasing process control unit which comprises a second connection switching unit for switching a connection status between the erasing process control unit and the plurality of storage devices, controls the second connection switching unit to connect itself with a storage device that is not connected with the reading/writing process control unit by the first connection switching unit, and executes a data erasing process for a storage device that is connected with itself.

A control apparatus according to the present invention is a control apparatus for controlling a data reading/writing process and a data erasing process for a plurality of storage devices, characterized by comprising: a reading/writing process control unit for executing a data reading/writing process for a storage device; a first connection switching unit for connecting the reading/writing process control unit with any one of the plurality of storage devices; an erasing process control unit for executing an erasing process of data stored in a storage device; and a second connection switching unit for connecting the erasing process control unit with a storage device which is not connected with the reading/writing process control unit by the first connection switching unit; whereby the reading/writing process control unit executes a data reading/writing process for one storage device which is connected by the first connection switching unit, and the erasing process control unit executes an erasing process of data stored in a storage device which is not connected with the reading/writing process control unit by the first connection switching unit.

With such a control system and a control apparatus according to the present invention, a data reading/writing process is executed for one storage device connected with a reading/writing process control unit by a first connection switching unit, an erasing process control unit is connected with a storage device which is not connected with the reading/writing process control unit by a second connection switching unit and an erasing process of data stored in the storage device which is connected with the erasing process control unit by the second connection switching unit is executed.

Accordingly, with such a control system and a control apparatus according to the present invention, since a data erasing process is performed for one storage device in parallel while a data reading/writing process is performed for another storage device, lowering of the access rate that accompanies data erasing standby can be decreased.

Moreover, a control system and a control apparatus according to the present invention are those of the above invention, characterized by further comprising a used area managing unit for storing information on a storage device and an area in the storage device used for a data writing process when a data writing process for any one of the plurality of storage devices by the reading/writing process control unit is completed, wherein the erasing process control unit executes an erasing process of data to be erased which is stored in a storage device to which the reading/writing process control unit has written data, on the basis of information stored in the used area managing unit.

With such a control system and a control apparatus according to the present invention, in addition to the operation of the control system and the control apparatus mentioned above, an erasing process of data to be erased which is stored in a storage device to which a reading/writing process control unit has written data is executed by an erasing process control unit on the basis of information stored in a used area managing unit.

Accordingly, with such a control system and a control apparatus according to the present invention, in addition to the effect of the control system and the control apparatus mentioned above, only data made redundant can be selectively erased on the basis of information stored in the used area managing unit.

Moreover, a control system and a control apparatus according to the present invention are those of the above invention, characterized in that the erasing process control unit accepts information for specifying data to be erased from the outside, and executes an erasing process of data to be erased which is stored in a storage device to which the reading/writing process control unit has written data, on the basis of information stored in the used area managing unit according to the accepted information.

With such a control system and a control apparatus according to the present invention, in addition to the operation of the control system and the control apparatus mentioned above, an erasing process of data to be erased which is stored in a storage device to which a reading/writing process control unit has written data is executed according to information accepted from the outside.

Accordingly, with such a control system and a control apparatus according to the present invention, in addition to the effect of the control system and the control apparatus mentioned above, since an erasing process of data to be erased which is stored in a storage device is executed according to information on data to be erased which is outputted from, for example, a CPU, any data can be erased from a storage device at any time point.

Furthermore, a control system and a control apparatus according to the present invention are those of the above invention, characterized in that the erasing process control unit executes an erasing process of read data which is stored in a storage device from which the reading/writing process control unit has read data, on the basis of information stored in the used area managing unit, when a reading process by the reading/writing process control unit is completed.

With such a control system and a control apparatus according to the present invention, in addition to the operation of the control system and the control apparatus mentioned above, when a reading process by a reading/writing process control unit is completed, an erasing process of read data which is stored in a storage device from which the reading/writing process control unit has read data is executed by an erasing process control unit on the basis of information stored in a used area managing unit.

Accordingly, with such a control system and a control apparatus according to the present invention, in addition to the effect of the control system and the control apparatus mentioned above, when data is required to be erased at the time of completion of a reading process of the data from one storage device, for example, an erasing process of data to be erased which is stored in the storage device is immediately executed on the basis of information stored in a used area managing unit.

Moreover, a control system according to the present invention is a control system for controlling a data reading/writing process and a data erasing process for a storage device, characterized by including: a plurality of storage devices, each having an erasing processing unit for executing an erasing process of data which is stored in itself, a reading/writing process control unit which comprises a connection switching unit for switching a connection status between the reading/writing process control unit and the plurality of storage devices, and controls the connection switching unit to execute a data reading/writing process for any one of the plurality of storage devices that is connected with itself; and an erasing managing unit for giving an erasing notice for specifying an erasing portion of data to a storage device which is not connected with the reading/writing process control unit by the connection switching unit, whereby each of the plurality of storage devices causes the erasing processing unit to execute an erasing process of data which is stored in itself, according to a received erasing notice, when an erasing notice is received from the erasing managing unit.

Moreover, a control apparatus according to the present invention is a control apparatus for controlling a data reading/writing process and a data erasing process for a plurality of storage devices, which executes a data erasing process according to a received erasing notice when an erasing notice of data is received, characterized by comprising: a reading/writing process control unit for executing a data reading/writing process for a storage device; a connection switching unit for connecting the reading/writing process control unit with any one of the plurality of storage devices; and an erasing managing unit for giving an erasing notice for specifying an erasing portion of data to a storage device, whereby the reading/writing process control unit executes a data reading/writing process for one storage device which is connected by the first connection switching unit, and the erasing managing unit gives an erasing notice to a storage device which is not connected with the reading/writing process control unit by the connection switching unit.

With such a control system and a control apparatus according to the present invention, a data reading/writing process is executed by a reading/writing process control unit for one storage device connected by a connection switching unit and an erasing notice is given by an erasing managing unit for a storage device which is not connected with the reading/writing process control unit by the connection switching unit.

Accordingly, with such a control system and a control apparatus according to the present invention, since a data erasing process is performed by giving an erasing notice to one storage device by an erasing managing unit while a data reading/writing process is performed for another storage device, lowering of the access rate that accompanies data erasing standby can be decreased.

Moreover, a control system and a control apparatus according to the present invention are those of the above invention, characterized by further comprising a used area managing unit for storing information on a storage device and an area in the storage device used for a data writing process when a data writing process for any one of the storage devices by the reading/writing process control unit is completed, wherein the erasing managing unit gives an erasing notice of data to be erased to a storage device to which the reading/writing process control unit has written data, on the basis of information stored in the used area managing unit.

With such a control system and a control apparatus according to the present invention, in addition to the operation of the control system and the control apparatus mentioned above, an erasing notice of data to be erased which is stored in a storage device to which a reading/writing process control unit has written data is given by an erasing managing unit on the basis of information stored in a used area managing unit.

Accordingly, with such a control system and a control apparatus according to the present invention, in addition to the effect of the control system and the control apparatus mentioned above, only data made redundant can be selectively erased on the basis of information stored in a used area managing unit.

Moreover, a control system and a control apparatus according to the present invention are those of the above invention, characterized in that the erasing managing unit accepts information for specifying data to be erased from the outside, and gives an erasing notice of data to be erased to a storage device to which the reading/writing process control unit has written data, on the basis of information stored in the used area managing unit according to the accepted information.

With such a control system and a control apparatus according to the present invention, in addition to the operation of the control system and the control apparatus mentioned above, an erasing process of data to be erased which is stored in a storage device to which a reading/writing process control unit has written data is executed according to information accepted from the outside.

Accordingly, with such a control system and a control apparatus according to the present invention, in addition to the effect of the control system and the control apparatus mentioned above, since an erasing process of data to be erased which is stored in a storage device is executed according to information on data to be erased which is outputted from, for example, a CPU, any data can be erased from a storage device at any time point.

Moreover, a control system and a control apparatus according to the present invention are those of the above invention, characterized in that the erasing managing unit gives an erasing notice for erasing read data to a storage device from which the reading/writing process control unit has read data, on the basis of information stored in the used area managing unit, when a reading process by the reading/writing process control unit is completed.

With such a control system and a control apparatus according to the present invention, in addition to the operation of the control system and the control apparatus mentioned above, when a reading process by a reading/writing process control unit is completed, an erasing notice for an erasing process of read data which is stored in a storage device from which the reading/writing process control unit has read data is given from an erasing managing unit to the storage device on the basis of information stored in a used area managing unit.

Accordingly, with such a control system and a control apparatus according to the present invention, in addition to the effect of the control system and the control apparatus mentioned above, when data is required to be erased at the time of completion of a reading process of the data from one storage device, for example, an erasing notice of data to be erased which is stored in the storage device is immediately given to the storage device on the basis of information stored in a used area managing unit, so that data to be erased is erased.

Moreover, a storage device according to the present invention is a storage device for which a data reading/writing process can be executed, characterized by comprising: an erasing accepting unit for accepting information for specifying an erasing portion of data from the outside; and an erasing processing unit for executing a data erasing process by writing meaningless data in the erasing portion specified by the information accepted by the accepting unit.

With such a storage device according to the present invention, when information for specifying a data erasing portion is accepted from the outside, a storage device itself executes a data erasing process according to the information.

With such a storage device according to the present invention, since an erasing process of data to be erased which is stored in a storage device itself is executed by the storage device itself according to information on data to be erased which is outputted from, for example, a CPU, a data reading/writing process or the like for another storage device can be executed in parallel in the meantime.

Moreover, a computer program product according to the present invention is a computer program product for controlling a data reading/writing process and a data erasing process for a plurality of storage devices, each having an erasing processing unit for executing an erasing process of data stored in itself according to an erasing notice received from the outside, characterized in that the computer program product comprises: a computer readable storage medium having computer readable program code means embodied in the medium, the computer readable program code means comprising computer instruction means for: executing a data reading/writing process for any one of the plurality of storage devices; and specifying an erasing portion of data to a storage device which is not executing a data reading/writing process to cause the erasing processing unit of a storage device which is not executing the data reading/writing process to erase data.

Furthermore, a computer program product according to the present invention is a computer program product mentioned above, characterized in that the computer is connected with an accessible memory, and the computer readable program code means further comprises computer instruction means for: storing in the memory information on a storage device and an area in the storage device used for a data writing process when a data writing process for any one of the plurality of storage devices is completed; and giving an erasing notice of data to be erased to a storage device to which data has been written, on the basis of information stored in the memory.

Furthermore, a computer program product according to the present invention is a computer program product mentioned above, characterized in that the computer readable program code means further comprises computer instruction means for: accepting information for specifying data to be erased; and giving an erasing notice of data to be erased to a storage device to which data has been written, on the basis of information stored in the memory according to the accepted information.

Furthermore, a computer program product according to the present invention is a computer program product mentioned above, characterized in that the computer readable program code means further comprises computer instruction means for giving an erasing notice for erasing read data to a storage device from which data has been read, on the basis of information stored in the memory when a data reading process from any one storage device is completed, whereby the read data is erased.

A computer program product according to the present invention mentioned above causes a general purpose computer to operate as a control system according to the present invention when being installed in the computer.

With a computer program product according to the present invention mentioned above, a control system according to the present invention is realized, not using a control apparatus according to the present invention but utilizing a general purpose computer.

The above and further objects and features of the invention will more fully be apparent from the following detailed description with accompanying drawings.

BRIEF DESCRIPTION OF THE SEVERAL VIEWS OF THE DRAWINGS

FIG. 8 is a block diagram showing an internal construction example of a control apparatus of Embodiment 3 of a control system according to the present invention and the connection status between the control apparatus and four HDDs according to the present invention.

DETAILED DESCRIPTION OF THE PREFERRED EMBODIMENTS

The following description will explain the present invention in the concrete with reference to the drawings illustrating the preferred embodiments thereof.

Embodiment 1

Figure 1:
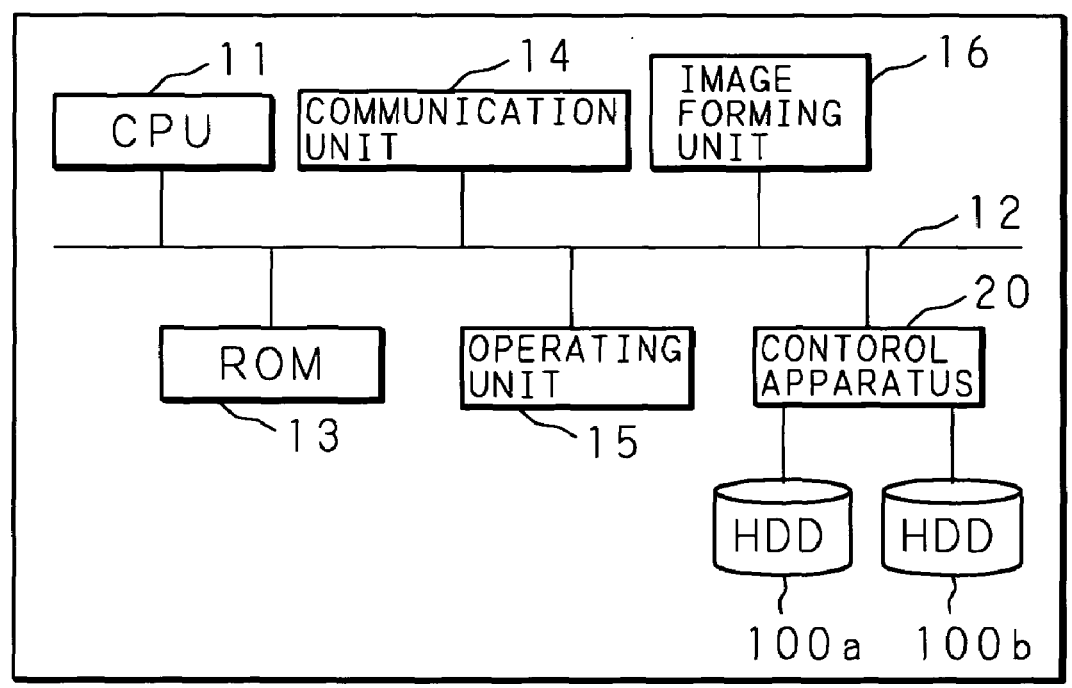
FIG. 1 is a block diagram showing an internal construction example of an image forming apparatus equipped with Embodiment 1 of a control system according to the present invention.

FIG. 1 is a block diagram showing an internal construction example of an image forming apparatus equipped with Embodiment 1 of a control system according to the present invention. Denoted at 11 is a CPU for controlling the entire image forming apparatus. The CPU 11 is connected with a ROM 13, a communication unit 14, an operating unit 15, an image forming unit 16, a control apparatus 20 according to the present invention and the like via a bus 12. By loading and executing a control program prestored in the ROM 13, the CPU 11 controls various kinds of hardware mentioned above connected with the bus 12 so as to cause them to function as an image forming apparatus as a whole.

The communication unit 14, which is an interface to be connected with a connection network not shown, can be connected with an information processing apparatus (not shown) such as an personal computer via the communication network. The communication unit 14 receives a print job from the information processing apparatus via the communication network and transmits information to be notified to the information processing apparatus. The communication unit 14 controls transmission and reception of various kinds of information via such a communication network.

The operating unit 15 is provided with various kinds of operating keys for accepting an operational instruction from the user and accepts an input of a set value for each function and the like and a switching operation between functions provided at the image forming apparatus.

The image forming unit 16 comprises, for example, a charger for charging a photoconductor drum at a predetermined potential, a laser writing device for emitting a laser beam according to image data extracted from a print job received via the communication unit 14 to generate an electrostatic latent image on the photoconductor drum, a developing device supplying the electrostatic latent image formed on the surface of the photoconductor drum with toner to make an image visible, a transfer device for transferring a toner image formed on the surface of the photoconductor drum onto paper and the like (all the elements are not illustrated) and forms an image required by the user on paper by an electrophotographic method. It should be noted that, though the image forming unit 16 in the example shown in FIG. 1 is constructed to form an image on paper by an electrophotographic method, it should be understood that an image forming unit 16 may be constructed to form an image by an ink-jet method, a thermal transfer method, a sublimation method or the like.

The control apparatus 20 comprises a connection switching unit (see FIG. 2) conforming to an interface standard such as the SCSI (Small Computer System Interface), the IDE (Integrated Device Electronics) or the like. In Embodiment 1, two HDDs (Hard Disk Drive) 100a and 100b are connected with the control apparatus 20 via the connection switching unit. The HDDs 100a and 100b are storage devices having a magnetic recording medium configured as a disk and stores a print job received via the communication unit 4, image data extracted from a print job and the like. The control unit 20 manages the status of use of each of the HDDs 100a and 100b and is constructed to erase redundant data in an HDD 100a (or HDD 100b) for which a writing process or a reading process of data such as a print job or image data is not being executed.

Figure 2:
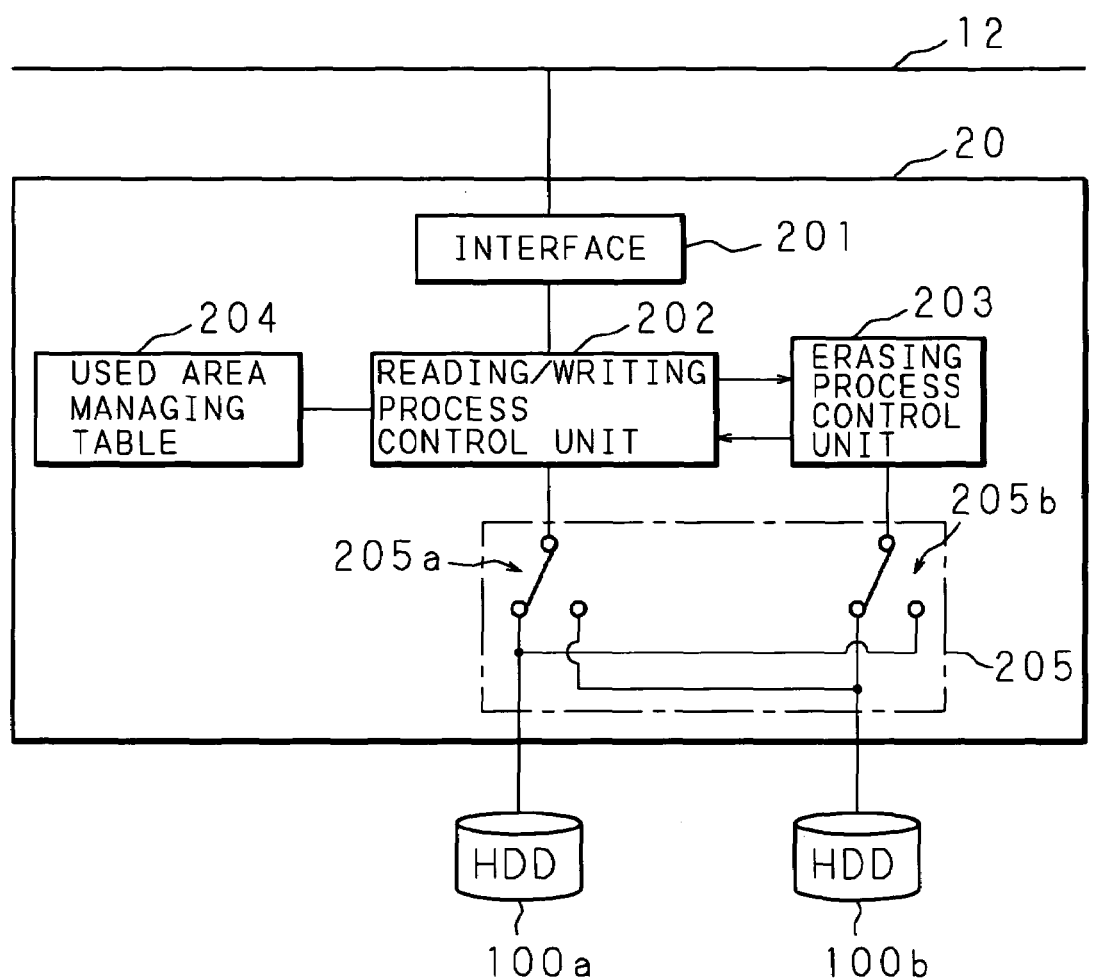
FIG. 2 is a block diagram showing an internal construction example of Embodiment 1 of a control apparatus according to the present invention and the connection status between the control apparatus and two HDDs.

FIG. 2 is a block diagram showing an internal construction example of the control apparatus of Embodiment 1 of a control system according to the present invention and the connection status between the control apparatus and two HDDs. The control apparatus 20 comprises an interface 201 to be connected with the bus 12, a reading/writing process control unit 202, an erasing process control unit 203, a used area managing table 204, a connection switching unit 205 and the like. It should be noted that the connection switching unit 205 is provided with switches 205a and 205b, which will be described in detail later.

The interface 201, which is a connection interface conforming to the standard of the bus 12, delivers various kinds of data via the bus 12. Data received by the interface 201 via the bus 12 includes an instruction from the CPU 11 as well as data mentioned above such as a print job or image data.

The reading/writing process control unit 202 controls one switch 205a of the connection switching unit 205 to connect itself with any one of the HDDs 100a and 100b and executes a data reading process or a data writing process for an HDD 100a (or HDD 100b) which is connected with itself. That is, the reading/writing process control unit 202 has a function of controlling a data reading process or a data writing process to be executed for the HDDs 100a and 100b.

The erasing process control unit 203 controls the other switch 205b of the connection switching unit 205 to connect itself with any one of the HDDs 100a and 100b and executes a data erasing process by, for example, overwriting meaningless data for an HDD 100a (or HDD 10b) which is connected with itself. That is, the erasing process control unit 203 has a function of controlling a data erasing process to be executed for the HDDs 100a and 100b. It should be noted that none of the HDDs 100a and 100b can be connected with both of the reading/writing process control unit 202 and the erasing process control unit 203 simultaneously.

The used area managing table 204 is constructed with a memory for storing management data (FAT data) such as the FAT (File Allocation Table) and manages a used area in the HDDs 100a and 100b. In particular, when data is written in a storage area in the HDDs 100a and 100b, the FAT data is updated by storing information indicative of which area of which HDD is used and the FAT data is referred to for reading data from a storage area of the HDDs 100a and 100b. The used area managing table 204 also manages information on an area storing redundant data such as data temporarily generated such as image data extracted from a print job or data for which an erasing instruction is given via the communication unit 14 or the operating unit 15. Accordingly, the used area managing table 204 can notify the erasing process control unit 203 of an erasing portion via the reading/writing process control unit 202.

Figure 3A:
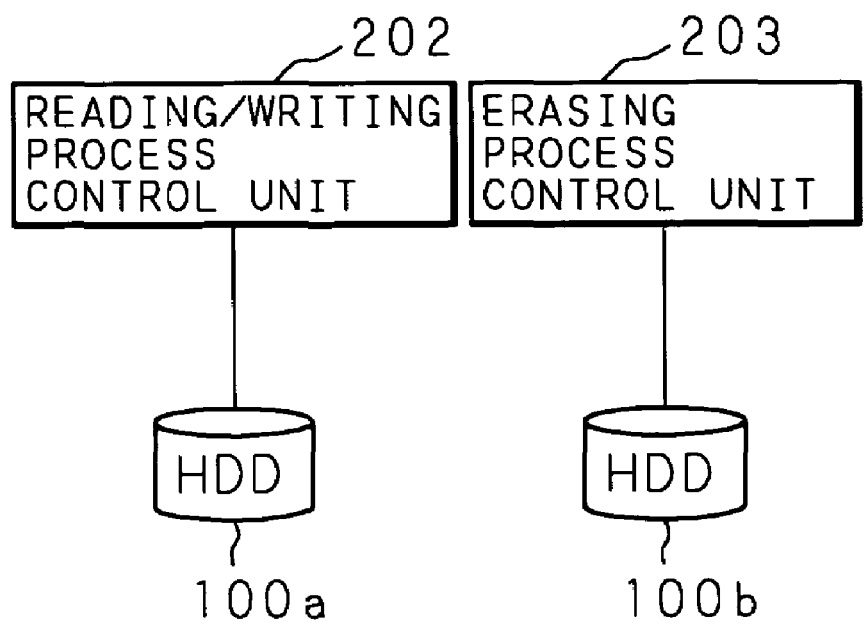
FIG. 3A and FIG. 3B are schematic views illustrating the connection status between HDDs and a control apparatus of Embodiment 1 of a control system according to the present invention.
Figure 3B:
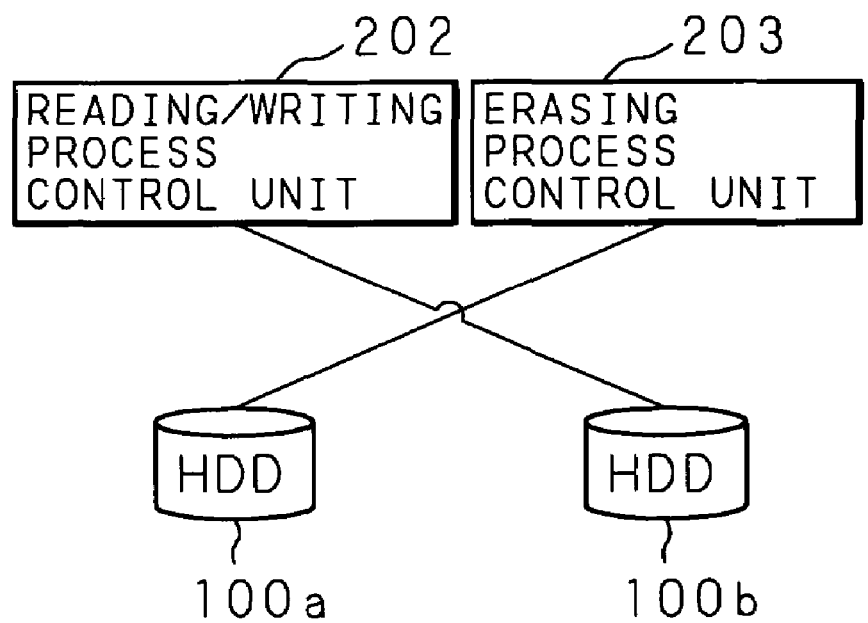

FIG. 3A and FIG. 3B are schematic views illustrating the connection status between the two HDDs 100a and 100b and the control apparatus 20 of Embodiment 1 of a control system according to the present invention, in particular, with the reading/writing process control unit 202 and the erasing process control unit 203. In Embodiment 1, the reading/writing process control unit 202 and the erasing process control unit 203 respectively control the switches 205a and 205b according to the status of use of the HDDs 100a and 100b, so that both of a reading process or a writing process and an erasing process can be performed in parallel and separately. For example, in the example shown in FIG. 3A, the HDD 100a connected with the reading/writing process control unit 202 can execute a reading process or a writing process while the HDD 100b connected with the erasing process control unit 203 can execute a data erasing process, and the both processes can be executed separately and in parallel. On the other hand, in the example shown in FIG. 3B, the HDD 100a connected with the erasing process control unit 203 can execute an erasing process while the HDD 100b connected with the reading/writing process control unit 202 can execute a data reading process or a data writing process, and the both processes can be executed separately and in parallel. The reading/writing process control unit 202 and the erasing process control unit 203 respectively control the switches 205a and 205b to switch the connection statuses of the HDDs 100a and 100b at predetermined timing and data in an HDD 100a (or HDD 100b) for which none of a reading process and a writing process is executed can be erased.

Figure 4:
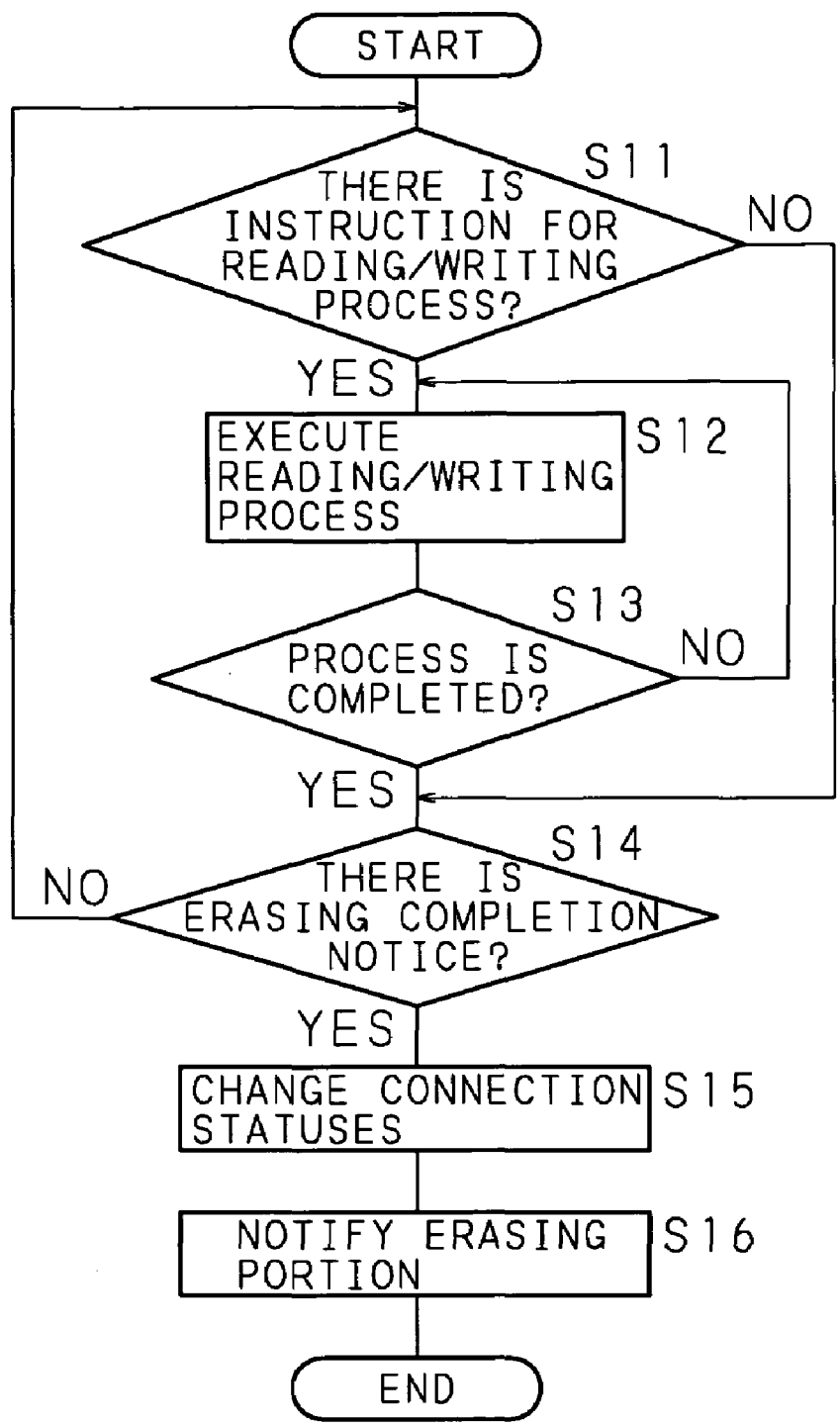
FIG. 4 is a flow chart illustrating the process procedure to be executed by a reading/writing process control unit of Embodiment 1 of a control system according to the present invention.

The following description will explain a process to be executed by the control apparatus 20 with reference to flow charts. FIG. 4 is a flow chart illustrating the process procedure to be executed by the reading/writing process control unit 202 of the control apparatus 20 of Embodiment 1 of a control system according to the present invention. The reading/writing process control unit 202 first judges whether there is (outputted) an instruction for a reading process or a writing process from the CPU 11 or not (step S11). When it is judged that there is an instruction for a reading process or a writing process (step S11: YES), the reading/writing process control unit 202 executes a reading process or a writing process according to the instruction (step S12). In particular, the reading/writing process control unit 202 executes a reading process of stored data or a writing process of data to be stored for an HDD 100a (or HDD 100b) which is connected at this time point via the switch 205a.

The reading/writing process control unit 202 then judges whether the process is completed or not on the basis of a status signal outputted from the HDD 100a (or HDD 100b) (step S13). When it is judged that the process is not completed (step S13: NO), the reading/writing process control unit 202 returns the process to the step S12 and continues a reading process or a writing process.

When it is judged in the step S13 that the reading process and the writing process are completed (step S13: YES) and when it is judged in the step S11 that there is no instruction for a reading process and a writing process (step S11: NO), in both cases, the reading/writing process control unit 202 judges whether there is an erasing completion notice from the erasing process control unit 203 or not (step S14). When it is judged that there is no erasing completion notice (step S14: NO), the reading/writing process control unit 202 returns the process to the step S11. When it is judged that there is an erasing completion notice (step S14: YES); the reading/writing process control unit 202 changes the connection statuses of the HDDs 100a and 100b (step S15). In particular, the connection statuses of the switches 205a and 205b are controlled and switched respectively so that the reading/writing process control unit 202 cuts off the connection of the HDD 100a (or HDD 100b) with itself at this time point and is connected with the other HDD 100b (or HDD 100a) and the erasing process control unit 203 cuts off the connection of the HDD 100b (or HDD 100a) with itself and is connected with the other HDD 100a (or HDD 100b). The reading/writing process control unit 202 then refers to the used area managing table 204 to notify the erasing process control unit 203 of an erasing portion in the HDD 100a (or HDD 100b) which is connected with the erasing process control unit 203 at this time point (step S16).

Figure 5:
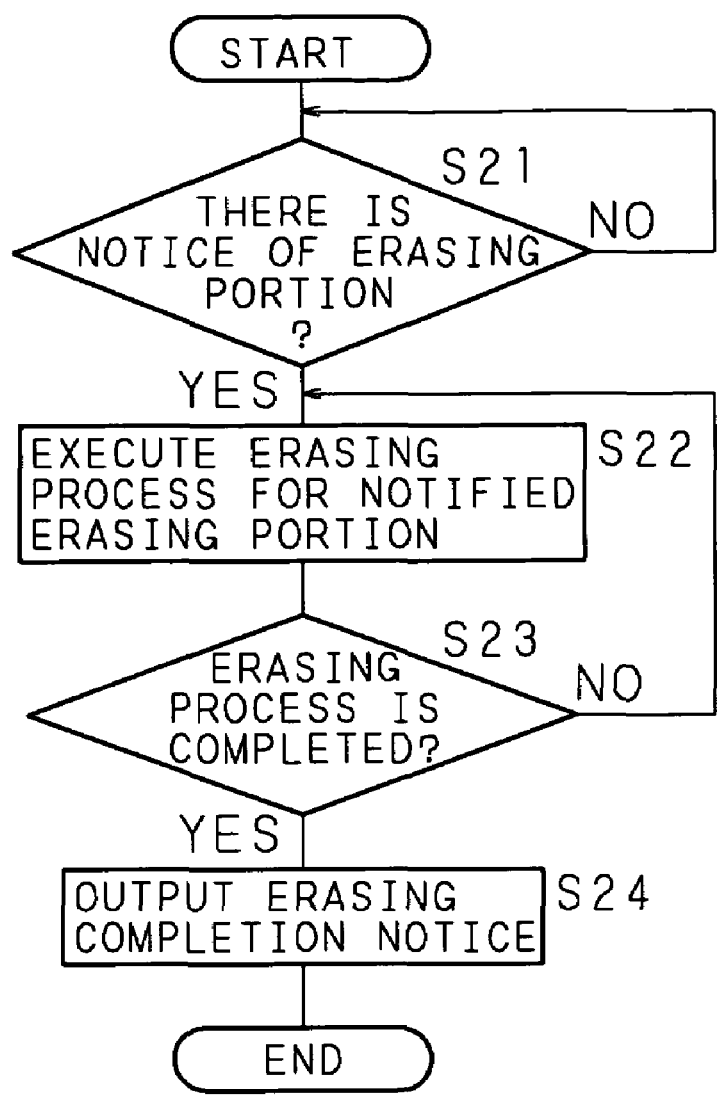
FIG. 5 is a flow chart illustrating the process procedure to be executed by an erasing process control unit of Embodiment 1 of a control system according to the present invention.

FIG. 5 is a flow chart illustrating the process procedure to be executed by the erasing process control unit 203 of Embodiment 1 of a control system according to the present invention. The erasing process control unit 203 of the control apparatus 20 first judges whether there is a notice of an erasing portion outputted from the reading/writing process control unit 202 or not (step S21). When it is judged that there is no notice of an erasing portion (step S21: NO), the erasing process control unit 203 waits for a notice of an erasing portion. When it is judged that there is a notice of an erasing portion (step S21: YES), the erasing process control unit 203 executes an erasing process for the notified erasing portion (step S22). In particular, for the HDD 100b (or HDD 100a) which is connected with the erasing process control unit 203 itself at this time point via the switch 205b, the erasing process control unit 203 executes an erasing process of data stored in a storage area corresponding to the erasing portion specified with the notice from the reading/writing process control unit 202.

The erasing process control unit 203 then judges whether the erasing process is completed or not on the basis of a status signal outputted from the HDD 100b (or HDD 100a) (step S23). When it is judged that the erasing process is not completed (step S23: NO), the erasing process control unit 203 returns the process to the step S22 and continues the erasing process. When it is judged that the erasing process is completed (step S23: YES), the erasing process control unit 203 outputs an erasing completion notice to the reading/writing process control unit 202 (step S24). As described above, the erasing completion notice outputted from the erasing process control unit 203 is confirmed in the process of the step S14 by the reading/writing process control unit 202.

Thus, in Embodiment 1 of a control system of the present invention, two HDDs 100a and 100b are used by switching the connection statuses via the connection switching unit 205 and both of a data access by a reading process or a writing process and an erasing process cannot be executed simultaneously for one HDD 100a (or 100b), so that lowering of the access rate that accompanies data erasing standby can be prevented. By the way, it is possibly required to erase data read from an HDD 100a immediately after the reading/writing process control unit 202 reads the data from the HDD 100a and performs a print process, for example. In such a case, since the control system described above according to the present invention is designed to store information on a region where data read from the HDD 100a and used for printing is stored as FAT data in the used area managing table 204, the erasing process control unit 203 can execute an erasing process of the data read from the HDD 100a by the reading/writing process control unit 202 immediately for the HDD 100a connected with itself when the reading/writing process control unit 202 reads the data and gives the data to the erasing process control unit 203.

It should be noted that Embodiment 1 is designed to switch the connection statuses of the HDDs 100a and 100b when both of a reading and writing process in one of the two HDDs 100a and 100b and an erasing process in the other are completed. However, the connection statuses of the HDDs 100a and 100b may be switched forcedly at the time when the reading/writing process control unit 202 completes a reading process or a writing process for one job to any one HDD.

Embodiment 2

The above Embodiment 1 is constructed to connect two HDDs 100a and 100b with the control apparatus 20 and control and switch the connection statuses of both HDDs to shorten the waiting time for an erasing process. However, further more HDDs may be connected. Embodiment 2 will explain a case where four HDDs are connected.

Figure 6:
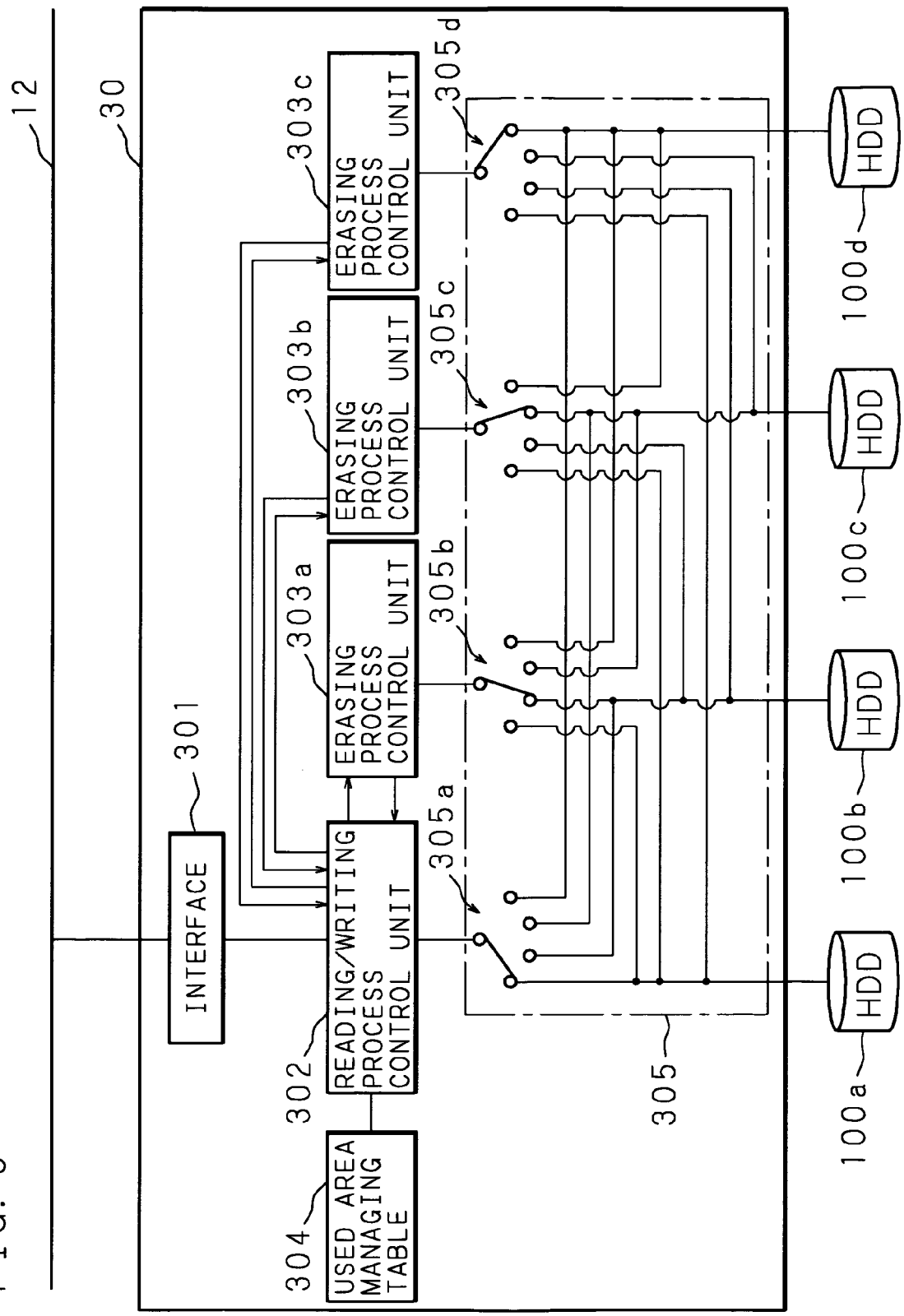
FIG. 6 is a block diagram showing an internal construction example of a control apparatus of Embodiment 2 of a control system according to the present invention and the connection status between the control apparatus and four HDDs.

FIG. 6 is a block diagram showing an internal construction example of a control apparatus of Embodiment 2 of a control system according to the present invention and the connection status between the control apparatus and four HDDs. A control apparatus 30 comprises an interface 301, a reading/writing process control unit 302, erasing process control units 303a, 303b and 303c, a used area managing table 304, and a connection switching unit 305, and is connected with a bus 12 in an image forming apparatus via an interface 301 similarly to Embodiment 1. It should be noted that the connection switching unit 305 is provided with switches 305a, 305b, 305c and 305d, which will be described in detail later.

The interface 301, which is a connection interface conforming to the standard of the bus 12, delivers various kinds of data via the bus 12. Data received by the interface 301 via the bus 12 includes data such as a print job or image data, an instruction from the CPU 11 (see FIG. 1) for controlling the entire image forming apparatus and the like.

The reading/writing process control unit 302 controls the switch 305a in the connection switching unit 305 to connect any one of the HDDs 100a, 100b, 100c and 100d with itself and executes a data reading process or a data writing process for an HDD 100*a* (or 100*b*, 100*c* or 100*d*) connected with itself. That is, the reading/writing process control unit 302 has a function of controlling a data writing process and a data reading process to be executed for the HDDs 100*a*, 100*b*, 100*c* and 100*d*.

The erasing process control unit 303*a* controls the switch 305*b* in the connection switching unit 305 to connect any one of the HDDs 100*a*, 100*b*, 100*c* and 100*d* with itself and executes a data erasing process for an HDD 100*a* (or HDD 100*b*, 100*c* or 100*d*) connected with itself. Similarly, each of the erasing process control units 303*b* and 303*c* controls each of the switches 305*c* and 305*d* in the connection switching unit 305 to connect any one of the HDDs 100*a*, 100*b*, 100*c* and 100*d* with itself and executes a data erasing process for an HDD 100*a* (or HDD 100*b*, 100*c* or 100*d*) connected with itself. That is, the erasing process control units 303*a*, 303*b* and 303*c* have a function of controlling a data erasing process to be executed for the HDDs 100*a*, 100*b*, 100*c* and 100*d*. It should be noted that the switches 305*a*, 305*b*, 305*c* and 305*d* are controlled so that none of the HDDs 100*a*, 100*b*, 100*c* and 100*d* is connected simultaneously with a plurality of units of the reading/writing process control unit 302 and the erasing process control units 303*a*, 303*b* and 303*c*.

The used area managing table 304 is constructed with a memory for storing management data (FAT data) such as the FAT (File Allocation Table) and manages a used area in the HDDs 100*a*, 100*b*, 100*c* and 100*d* similarly to Embodiment 1.

Figure 7A:
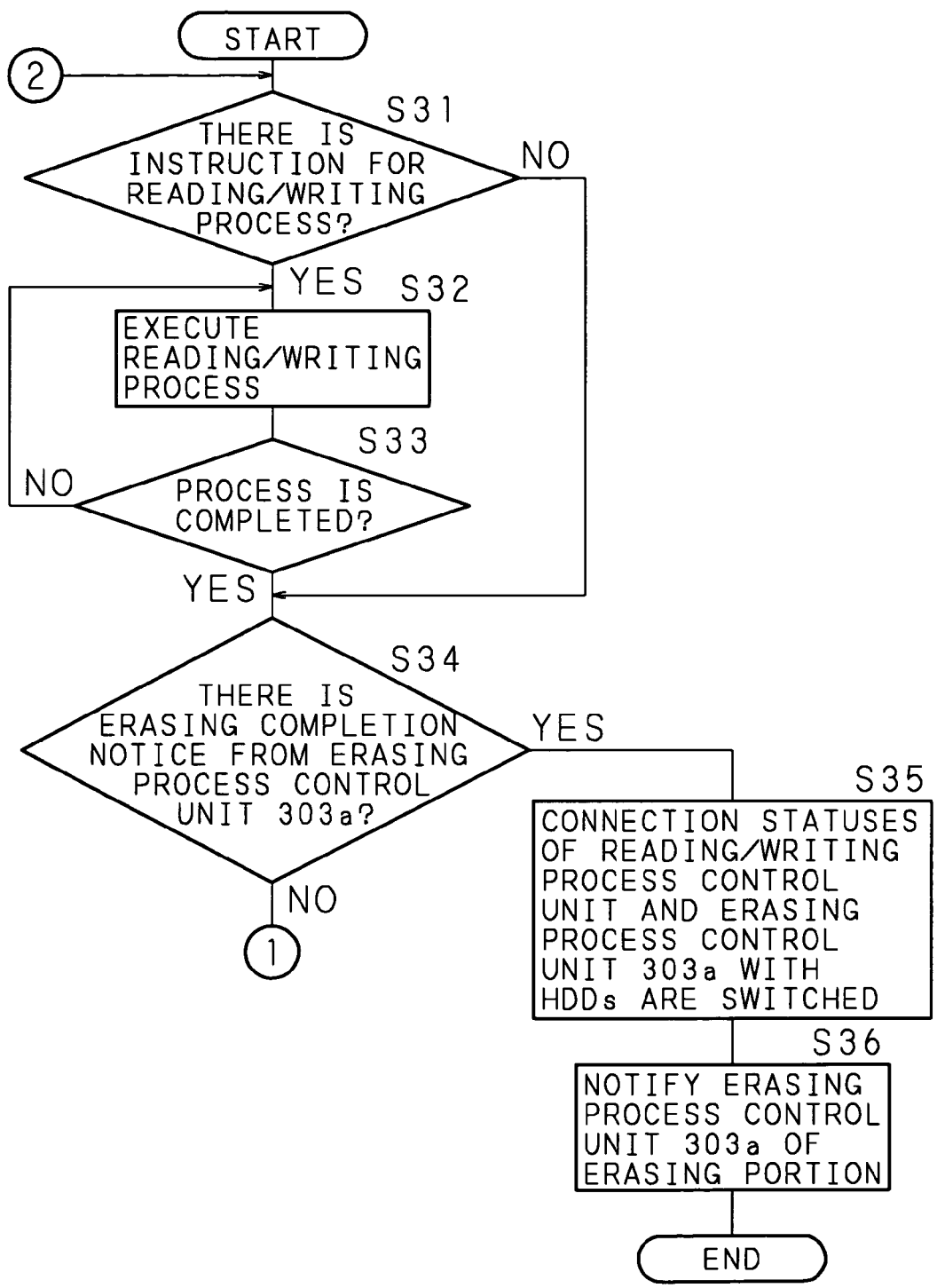
FIG. 7A and FIG. 7B are flow charts illustrating the process procedure to be executed by a reading/writing process control unit.
Figure 7B:
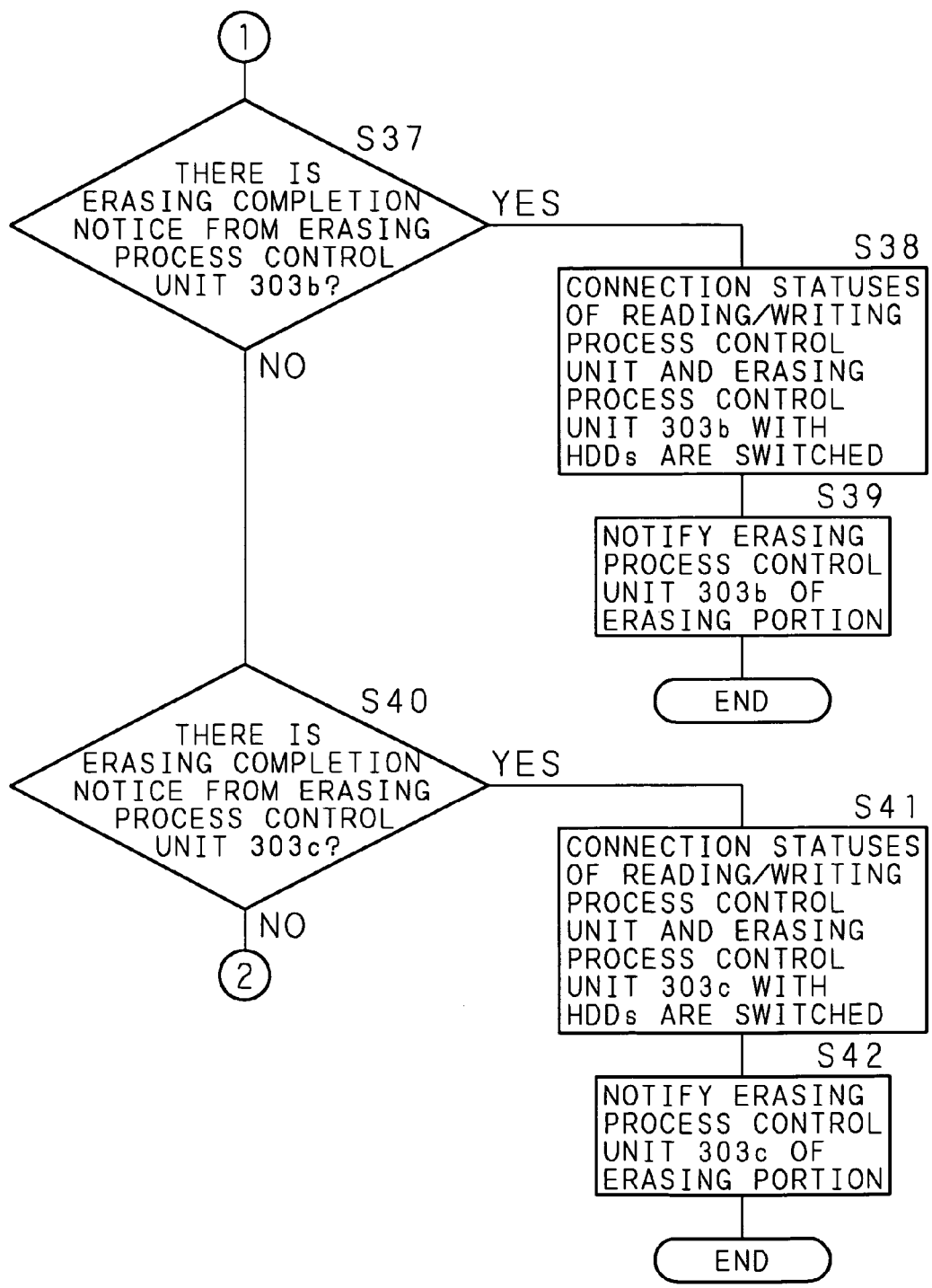

FIG. 7A and FIG. 7B are flow charts illustrating the process procedure to be executed by the reading/writing process control unit 302 of the control apparatus 30 of Embodiment 2 of a control system according to the present invention. It should be noted that the reading/writing process control unit 302 is connected with the HDD 100*a* and the erasing process control units 303*a*, 303*b* and 303*c* are connected respectively with the HDDs 100*b*, 100*c* and 100*d*, at the time when execution of the present flow chart is started.

The reading/writing process control unit 302 of the control unit 30 first judges whether there is an instruction for a reading process or a writing process from the CPU 11 or not (step S31). When it is judged that there is an instruction for a reading process or a writing process (step S31: YES), the reading/writing process control unit 302 executes a data reading process of a data writing process for an HDD 100*a* which is connected with the reading/writing process control unit 302 at this point via the switch 305*a* (step S32).

The reading/writing process control unit 302 then judges whether the process is completed or not on the basis of a status signal outputted form the HDD 100*a* (step S33). When it is judged that the process is not completed (step S33: NO), the reading/writing process control unit 302 returns the process to the step S32 and continues a reading process or a writing process.

When it is judged in the step S33 that a reading process and a writing process are completed (step S33: YES) and when it is judged in the step S31 that there is no instruction for a reading process and a writing process (step S31: NO), in both cases, the reading/writing process control unit 302 judges whether there is an erasing completion notice from the erasing process control unit 303*a* or not (step S34). When it is judged that there is an erasing completion notice from the erasing process control unit 303*a* (step S34: YES), the connection statuses among the reading/writing process control unit 302 and the erasing process control unit 303*a* and the HDDs 100*a* and 100*b* are switched (step S35). In particular, the reading/writing process control unit 302 controls the switch 305*a* to connect itself with the HDD 100*b* instead of the HDD 100*a* having been connected and gives a signal for switching the switch 305*b* to the erasing process control unit 303*a*. The erasing process control unit 303*a* controls the switch 305*b* according to this signal to connect itself with the HDD 100*a* instead of the HDD 100*b* having been connected. The reading/writing process control unit 302 then notifies the erasing process control unit 303*a* of an erasing portion (step S36). Receiving a notice of an erasing portion, the erasing process control unit 303*a* executes an erasing process of data stored in the HDD 100*a* similarly to the process procedure in Embodiment 1 shown in FIG. 5.

When it is judged that there is no erasing completion notice from the erasing process control unit 303*a* (step S34: NO), the reading/writing process control unit 302 judges whether there is an erasing completion notice from the erasing process control unit 303*b* or not (step S37). When it is judged that there is an erasing completion notice from the erasing process control unit 303*b* (step S37: YES), the reading/writing process control unit 302 and the erasing process control unit 303*b* respectively control the switches 305*a* and 305*c* as described above to switch the connection statuses among the reading/writing process control unit 302, the erasing process control unit 303*b* and the HDDs 100*a* and 100*c* (step S38). In particular, the reading/writing process control unit 302 controls the switch 305*a* to connect itself with the HDD 100*c* instead of the HDD 100*a* having been connected and gives a signal for switching the switch 305*b* to the erasing process control unit 303*b*. The erasing process control unit 303*b* controls the switch 30*c* according to this signal to connect itself with the HDD 100*a* instead of the HDD 100*c* having been connected. The reading/writing process control unit 302 then notifies the erasing process control unit 303*b* of an erasing portion (step S39). Receiving a notice of an erasing portion, the erasing process control unit 303*b* executes an erasing process of data stored in the HDD 100*a* similarly to the process procedure in Embodiment 1 shown in FIG. 5.

When it is judged that there is no erasing completion notice from the erasing process control unit 303*b* (step S37: NO), the reading/writing process control unit 302 judges whether there is an erasing completion notice from the erasing process control unit 303*c* or not (step S40). When it is judged that there is an erasing completion notice from the erasing process control unit 303*c* (step S40: YES), the reading/writing process control unit 302 and the erasing process control unit 303*c* respectively control the switches 305*a* and 305*b* as described above to switch the connection statuses among the reading/writing process control unit 302, the erasing process control unit 303*c* and the HDDs 100*a* and 100*d* (step S41). In particular, the reading/writing process control unit 302 controls the switch 305*a* to connect itself with the HDD 100*d* instead of the HDD 100*a* having been connected and gives a signal for switching the switch 305*b* to the erasing process control unit 303*c*. The erasing process control unit 303*c* controls the switch 305*d* according to this signal to connect itself with the HDD 100*a* instead of the HDD 100*d* having been connected. The reading/writing process control unit 302 then notifies the erasing process control unit 303*c* of an erasing portion (step S42). Receiving a notice of an erasing portion, the erasing process control unit 303*c* executes an erasing process of data stored in the HDD 100*a* similarly to the process procedure in Embodiment 1 shown in FIG. 5. When it is judged in the step S40 that there is no erasing completion notice from the erasing process control unit 303c (step S40: NO), the reading/writing process control unit 302 returns the process to the step S31.

Thus, in Embodiment 2, a data erasing process can be executed for one or more of three HDDs while a reading/writing process is being executed for the other one of four HDDs 100a, 100b, 100c and 100d. Accordingly, in Embodiment 2, since erasing processes can be executed in parallel in a plurality of HDDs, the effect of preventing lowering of the access rate that accompanies data erasing standby can be enhanced.

Embodiment 3

The Embodiments 1 and 2 described above is constructed to connect a plurality of commonly used HDDs with the control unit 20 or 30 and execute a data reading process, data writing process and a data erasing process for each HDD with the control unit 20 or 30. However, in order to simplify the internal construction of the control unit 20 or 30, a part of function can be realized by each HDD side. Such a construction will be explained hereinafter.

FIG. 8 is a block diagram showing an internal construction example of a control apparatus of Embodiment 3 of a control system according to the present invention and the connection status between the control apparatus and four HDDs according to the present invention. A control unit 40 comprises an interface 401, a reading/writing process control unit 402, a used area managing table 404 and a switch 405 as a connection switching unit, and is connected with a bus 12 in an image forming apparatus via the interface 401 similarly to Embodiment 1.

The interface 401, which is a connection interface conforming to the standard of the bus 12, delivers various kinds of data via the bus 12. Data received by the interface 401 via the bus 12 includes data such as a print job or image data and an instruction from the CPU 11 (see FIG. 1) for controlling the entire image forming apparatus.

The reading/writing process control unit 402 controls the switch 405 to connect itself with any one of the four HDDs 110a, 110b, 110c and 110d as an example and executes a data reading process or a data writing process for an HDD 110a (or HDD 110b, 110c or 110d) which is connected with itself. That is, the reading/writing process control unit 402 has a function of controlling a reading process and a writing process to be executed for the HDDs 110a, 110b, 110c and 110d. The reading/writing process control unit 402 also comprises an erasing managing unit 402a for managing information indicative of an erasing portion which is necessary for executing an erasing process in each of the HDDs 110a, 110b, 110c and 110d. Accordingly, comprising the erasing managing unit 402a, the reading/writing process control unit 402 also has a function of notifying each of the HDDs 110a, 110b, 110c and 110d of an erasing portion.

The used area managing table 404, which is constructed with a memory for storing management data (FAT data) such as the FAT (File Allocation Table), manages a used area in the HDDs 110a, 110b, 110c and 110d similarly to Embodiments 1 and 2.

The HDD 110a comprises a storage unit 111a which is a storage area for storing data and an erasing processing unit 112a for receiving a notice from the erasing managing unit 402a and executing an erasing process of data stored in the storage unit 111a. The HDDs 110b, 110c and 110d are the same in construction and respectively comprise storage units 111b, 111c and 111d and erasing processing units 112b, 112c and 112d.

Figure 9A:
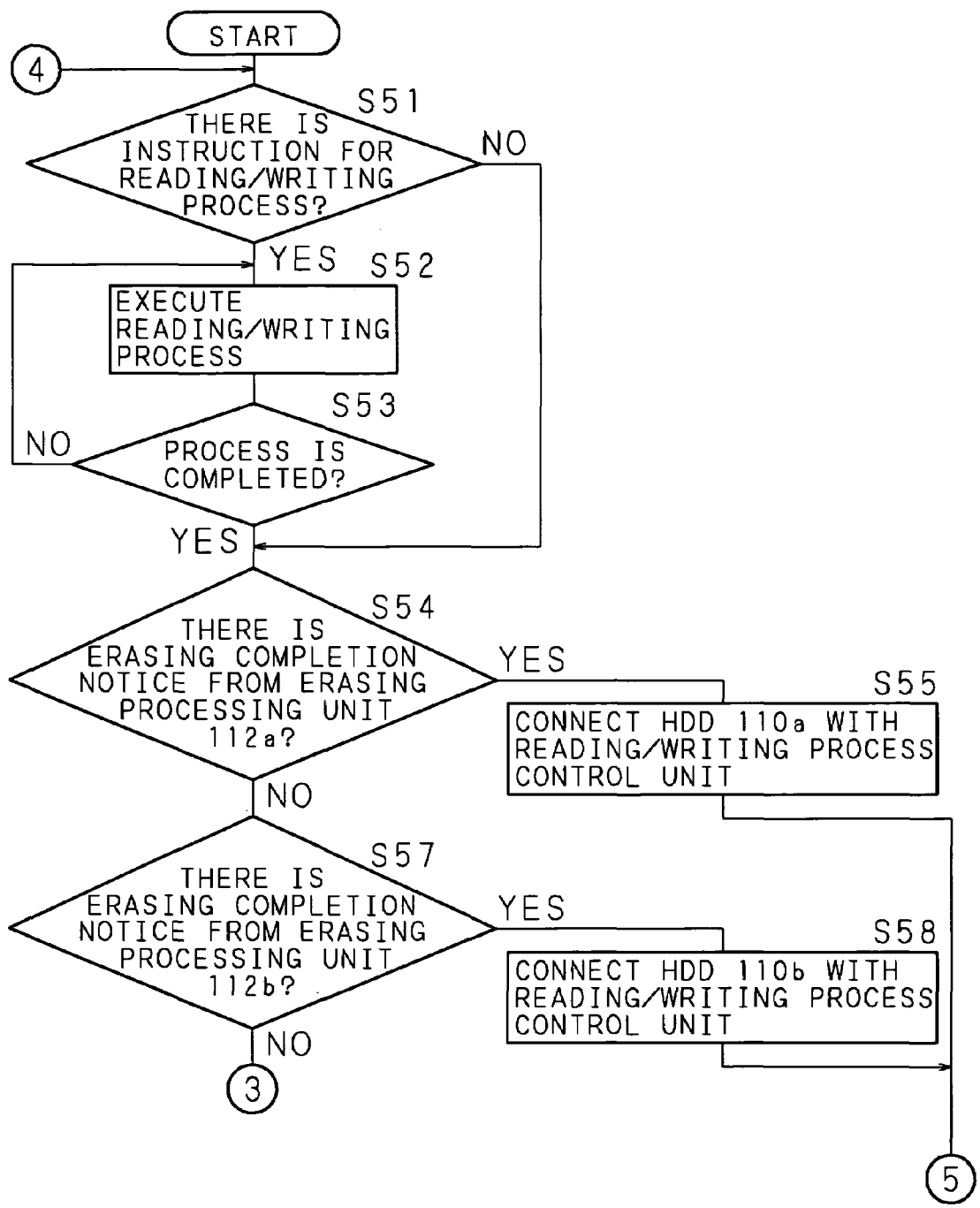
FIG. 9A and FIG. 9B are flow charts illustrating the process procedure to be executed by a reading/writing process control unit of Embodiment 3 of a control system according to the present invention.
Figure 9B:
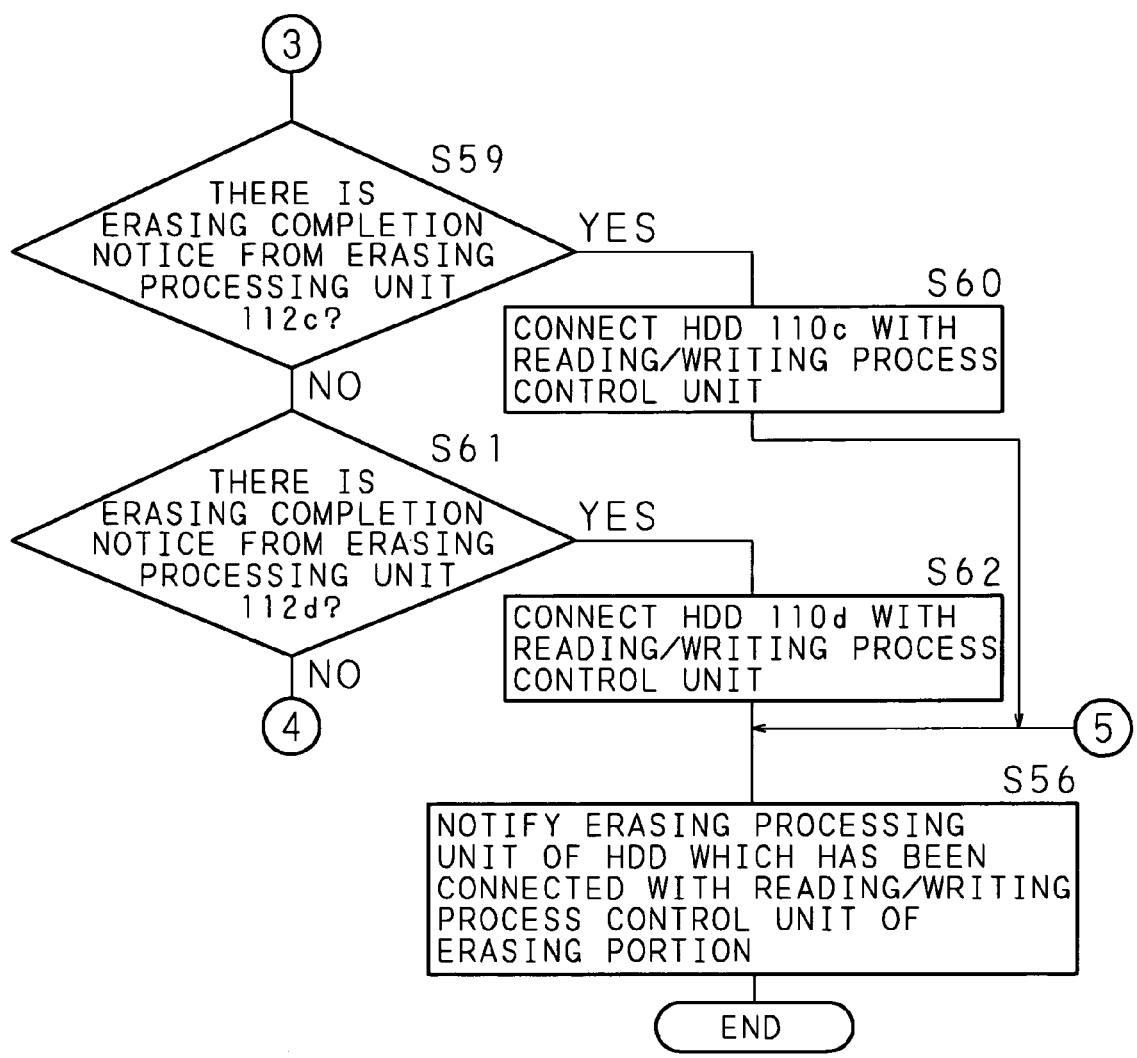

FIG. 9A and FIG. 9B are flow charts illustrating the process procedure to be executed by the reading/writing process control unit 402 of the control unit 40 of Embodiment 3 of a control system according to the present invention. It should be noted that the following description will explain an example wherein a process is started from the state where the reading/writing process control unit 402 is connected with the HDD 110a. The reading/writing process control unit 402 first judges whether there is an instruction for a reading process or a writing process from the CPU 11 or not (step S51). When it is judged that there is an instruction for a reading process or a writing process (step S51: YES), the reading/writing process control unit 402 executes a data reading process or a data writing process for an HDD 110a which is connected with itself at this time point via the switch 405 (step S52).

The reading/writing process control unit 402 then judges whether the process is completed or not on the basis of a status signal outputted from the HDD 110a connected with itself (step S53). When it is judged that the process is not completed (step S53: NO), the reading/writing process control unit 402 returns the process to the step S52 and continues a reading process or a writing process.

When it is judged in the step S53 that a reading process and a writing process are completed (step S53: YES) and when it is judged in the step S51 that there is no instruction for a reading process and a writing process (step S51: NO), in both cases, the reading/writing process control unit 402 judges whether there is an erasing completion notice from the erasing processing unit 112a in the HDD 110a connected with itself or not (step S54). When it is judged that there is an erasing completion notice from the erasing process portion 112a in the HDD 110a (step S54: YES), the reading/writing process control unit 402 controls the switch 405 to connect the HDD 110a with itself (it should be noted that the connection status of the switch 405 is only maintained in this case since the reading/writing process control unit 402 is already connected with the HDD 110a) (step S55) and causes the erasing managing unit 402a to notify the erasing processing unit 112b (or 112c or 112d) of the HDD 110b (or 110c or 110d) which has been connected before the HDD 110a of an erasing portion (step S56). The reading/writing process control unit 402 then executes a data reading process or a data writing process for the HDD 110a connected with itself and executes a data erasing process for the HDD 110b (or 112c or 112d) to which an erasing portion is notified from the erasing managing unit 402a. Receiving a notice of an erasing portion, the HDD 110b (or 112c or 112d) executes a data erasing process similarly to the process procedures in Embodiment 1 shown in FIG. 5 and gives an erasing completion notice to the erasing managing unit 402a of the reading/writing process control unit 402 at the time of completion of the erasing portion.

When it is judged that there is no erasing completion notice from the erasing processing unit 112a of the HDD 110a (step S54: NO), the reading/writing process control unit 402 judges whether there is an erasing completion notice from the erasing processing unit 112b in the HDD 110b or not (step S57). When it is judged that there is an erasing completion notice from the erasing processing unit 112b in the HDD 110b (step S57: YES), the reading/writing process control unit 402 controls the switch 405 to connect the HDD 110b with itself (step S58) and causes the erasing managing unit 402a to notify the erasing processing unit 112a of the HDD 110a which has been connected with itself of an erasing portion (step S56). The reading/writing process control unit 402 then executes a data reading process or a data writing process for the HDD 110b connected with itself and executes a data erasing process for the HDD 110a to which the erasing managing unit 402a notifies an erasing portion. Receiving a notice of an erasing portion, the HDD 110a executes a data erasing process similarly to the process procedure in Embodiment 1 shown in FIG. 5 and gives an erasing completion notice to the erasing managing unit 402a of the reading/writing process control unit 402 at the time of completion of the erasing process.

When it is judged that there is no erasing completion notice from the erasing processing unit 112b of the HDD 110b (step S57: NO), the reading/writing process control unit 402 judges whether there is an erasing completion notice from the erasing processing unit 112c in the HDD 110c or not (step S59). When it is judged that there is an erasing completion notice from the erasing processing unit 112c in the HDD 110c (step S59: YES), the reading/writing process control unit 402 controls the switch 405 to connect the HDD 110c with itself (step S60) and causes the erasing managing unit 402a to notify the erasing processing unit 112a of the HDD 110a which has been connected with itself of an erasing portion (step S56). The reading/writing process control unit 402 then executes a data reading process or a data writing process for the HDD 110c which is connected with itself and executes a data erasing process for the HDD 110a to which the erasing managing unit 402a notifies an erasing portion. At the HDD 110a which has received a notice of an erasing portion, similarly to the process procedure in Embodiment 1 shown in FIG. 5, the erasing processing unit 112a executes a data erasing process and gives an erasing completion notice to the erasing managing unit 402a of the reading/writing process control unit 402 at the time of completion of the erasing process.

When it is judged that there is no erasing completion notice from the erasing processing unit 112c of the HDD 110c (step S59: NO), the reading/writing process control unit 402 judges whether there is an erasing completion notice from the erasing processing unit 112d in the HDD 110d or not (step S61). When it is judged that there is an erasing completion notice from the erasing processing unit 112d in the HDD 110d (step S61: YES), the reading/writing process control unit 402 controls the switch 405 to connect the HDD 110d with itself (step S62) and causes the erasing managing unit 402a to notify the erasing processing unit 112a of the HDD 110a which has been connected with itself of an erasing portion (step S56). The reading/writing process control unit 402 then executes a data reading process or a data writing process for the HDD 110d which is connected with itself and executes a data erasing process for the HDD 110a to which the erasing managing unit 402a notifies an erasing portion. Receiving a notice of an erasing portion, the HDD 110a executes a data erasing process similarly to the process procedures in Embodiment 1 shown in FIG. 5 and gives an erasing completion notice to the erasing managing unit 402a of the reading/writing process control unit 402 at the time of completion of the erasing process. It should be noted that the reading/writing process control unit 402 returns the process to the step S51 when it is judged that there is no erasing completion notice from the erasing processing unit 112d (step S61: NO).

Thus, in Embodiment 3 comprising erasing processing units 112a, 112b, 112c and 112d respectively in the HDDs 110a, 110b, 110c and 110d, it is unnecessary to comprise a plurality of erasing process control units, switches or the like in the control apparatus 40, so that the construction of the control apparatus 40 can be simplified.

Moreover, Embodiment 3 is constructed to switch and control four HDDs 110a, 110b, 110c and 110d by comprising the control unit 40. However, a computer program according to the present invention may be stored in the ROM 13 instead of comprising the control apparatus 40, so that the HDDs 110a, 110b, 110c and 110d can be switched and controlled when the CPU 11 executes this computer program. In this case, the CPU 11 to which the computer program described above is loaded executes a reading/writing process for any one of the HDDs 110a, 110b, 110c and 110d, e.g. the HDD 110a, and gives an instruction for an erasing process to one or more of the other HDDs 110b, 110c and 110d. At the HDD 110b (and/or 110c, 110d) to which an erasing process is given, the erasing processing unit 112b (and/or 112c, 112d) erases data stored in the storage unit 111b (and/or 111c, 111d). Accordingly, in this case, a data reading/writing process is also executed for one of a plurality of HDDs and a data erasing process is executed for other one or more of HDDs.

Each of the above Embodiments explains the construction wherein a control apparatus according to the present invention is incorporated into an image forming apparatus. However, a control apparatus according to the present invention does not always have to be incorporated into an image forming apparatus but may be incorporated into, for example, an image processing apparatus such as a scanner, a facsimile machine or a digital multi function printer, an information processing apparatus such as a personal computer, a workstation or a server device, or an HDD recorder for recording video data and the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control system for controlling a data reading/writing process and a data erasing process for a storage device, including:
   a plurality of storage devices;
   a reading/writing process control unit which comprises a first connection switching unit for switching a connection status between said reading/writing process control unit and said plurality of storage devices, and controls said first connection switching unit to execute a data reading/writing process for any one of said plurality of storage devices that is connected with itself; and
   an erasing process control unit which comprises a second connection switching unit for switching a connection status between said erasing process control unit and said plurality of storage devices, controls said second connection switching unit to connect itself with a storage device that is not connected with said reading/writing process control unit by said first connection switching unit, and executes a data erasing process for a storage device that is connected with itself.

2. The control system as set forth in claim 1, further comprising a used area managing unit for storing information on a storage device and an area in said storage device used for a data writing process when a data writing process for any one of said plurality of storage devices by said reading/writing process control unit is completed, wherein said erasing process control unit executes an erasing process of data to be erased which is stored in a storage device to which said reading/writing process control unit has written data, on the basis of information stored in said used area managing unit.

3. The control system as set forth in claim 2, wherein said erasing process control unit accepts information for specifying data to be erased from the outside, and executes an erasing process of data to be erased which is stored in a storage device to which said reading/writing process control unit has written data, on the basis of information stored in said used area managing unit according to the accepted information.

4. The control system as set forth in claim 2, wherein said erasing process control unit executes an erasing process of read data which is stored in a storage device from which said reading/writing process control unit has read data, on the basis of information stored in said used area managing unit, when a reading process by said reading/writing process control unit is completed.

5. A control system for controlling a data reading/writing process and a data erasing process for a storage device, including:
    a plurality of storage devices, each having an erasing processing unit for executing an erasing process of data which is stored in itself;
    a reading/writing process control unit which comprises a connection switching unit for switching a connection status between said reading/writing process control unit and said plurality of storage devices, and controls said connection switching unit to execute a data reading/writing process for any one of said plurality of storage devices that is connected with itself; and
    an erasing managing unit for giving an erasing notice for specifying an erasing portion of data to a storage device which is not connected with said reading/writing process control unit by said connection switching unit,
    whereby each of said plurality of storage devices causes said erasing processing unit to execute an erasing process of data which is stored in itself, according to a received erasing notice, when an erasing notice is received from said erasing managing unit.

6. The control system as set forth in claim 5, further comprising a used area managing unit for storing information on a storage device and an area in said storage device used for a data writing process when a data writing process for any one of said storage devices by said reading/writing process control unit is completed,
    wherein said erasing managing unit gives an erasing notice of data to be erased to a storage device to which said reading/writing process control unit has written data, on the basis of information stored in said used area managing unit.

7. The control system as set forth in claim 6, wherein said erasing managing unit accepts information for specifying data to be erased from the outside, and gives an erasing notice of data to be erased to a storage device to which said reading/writing process control unit has written data, on the basis of information stored in said used area managing unit according to the accepted information.

8. The control system as set forth in claim 6, wherein said erasing managing unit gives an erasing notice for erasing read data to a storage device from which said reading/writing process control unit has read data, on the basis of information stored in said used area managing unit, when a reading process by said reading/writing process control unit is completed.

9. The control system as set forth in claim 5, wherein each of said plurality of storage devices further has an erasing accepting unit for accepting an erasing notice for specifying an erasing portion of data from said erasing management unit;
    wherein said erasing processing unit executes a data erasing process by writing meaningless data in said erasing portion specified by the erasing notice accepted by said accepting unit.

10. A control apparatus for controlling a data reading/writing process and a data erasing process for a plurality of storage devices, comprising:
    a reading/writing process control unit for executing a data reading/writing process for a storage device;
    a first connection switching unit for connecting said reading/writing process control unit with any one of said plurality of storage devices;
    an erasing process control unit for executing an erasing process of data stored in a storage device; and
    a second connection switching unit for connecting said erasing process control unit with a storage device which is not connected with said reading/writing process control unit by said first connection switching unit;
    whereby said reading/writing process control unit executes a data reading/writing process for one storage device which is connected by said first connection switching unit, and
    said erasing process control unit executes an erasing process of data stored in a storage device which is not connected with said reading/writing process control unit by said first connection switching unit.

11. The control apparatus as set forth in claim 10, further comprising a used area managing unit for storing information on a storage device and an area in said storage device used for a data writing process when a data writing process for any one of said plurality of storage devices by said reading/writing process control unit is completed,
    wherein said erasing process control unit executes an erasing process of data to be erased which is stored in a storage device to which said reading/writing process control unit has written data, on the basis of information stored in said used area managing unit.

12. The control apparatus as set forth in claim 11, wherein said erasing process control unit accepts information for specifying data to be erased from the outside, and executes an erasing process of data to be erased which is stored in a storage device to which said reading/writing process control unit has written data, on the basis of information stored in said used area managing unit according to the accepted information.

13. The control apparatus as set forth in claim 11, wherein said erasing process control unit executes an erasing process of read data which is stored in a storage device from which said reading/writing process control unit has read data, on the basis of information stored in said used area managing unit, when a reading process by said reading/writing process control unit is completed.

14. A control apparatus for controlling a data reading/writing process and a data erasing process for a plurality of storage devices, which executes a data erasing process according to a received erasing notice when an erasing notice of data is received, comprising:
    a reading/writing process control unit for executing a data reading/writing process for a storage device;
    a connection switching unit for connecting said reading/writing process control unit with any one of said plurality of storage devices; and an erasing managing unit for giving an erasing notice for specifying an erasing portion of data to a storage device,
whereby said reading/writing process control unit executes a data reading/writing process for one storage device which is connected by said first connection switching unit, and
said erasing managing unit gives an erasing notice to a storage device which is not connected with said reading/writing process control unit by said connection switching unit.

15. The control apparatus as set forth in claim 14, further comprising a used area managing unit for storing information on a storage device and an area in said storage device used for a data writing process when a data writing process for any one of said storage devices by said reading/writing process control unit is completed,
wherein said erasing managing unit gives an erasing notice of data to be erased to a storage device to which said reading/writing process control unit has written data, on the basis of information stored in said used area managing unit.

16. The control apparatus as set forth in claim 15, wherein said erasing managing unit accepts information for specifying data to be erased from the outside, and gives an erasing notice of data to be erased to a storage device to which said reading/writing process control unit has written data, on the basis of information stored in said used area managing unit according to the accepted information.

17. The control apparatus as set forth in claim 15, wherein said erasing managing unit gives an erasing notice for erasing read data to a storage device from which said reading/writing process control unit has read data, on the basis of information stored in said used area managing unit, when a reading process by said reading/writing process control unit is completed.

18. The control apparatus as set forth in claim 14, wherein each of said plurality of storage devices further has:
an erasing accepting unit for accepting an erasing notice for specifying an erasing portion of data from said erasing managing unit; and
an erasing processing unit for executing a data erasing process by writing meaningless data in said erasing portion specified by the erasing notice accepted by said accepting unit.

19. A computer program product for controlling a data reading/writing process and a data erasing process for a plurality of storage devices, each having an erasing processing unit for executing an erasing process of data stored in itself according to an erasing notice received from the outside, wherein said computer program product comprises:
a computer readable storage medium having computer readable program code means embodied in said medium, said computer readable program code means comprising computer instruction means for:
executing a data reading/writing process for any one of said plurality of storage devices; and
specifying an erasing portion of data to a storage device which is not executing a data reading/writing process to cause said erasing processing unit of a storage device which is not executing the data reading/writing process to erase data.

20. The computer program product as set forth in claim 19, wherein
said computer is connected with an accessible memory, and
said computer readable program code means further comprises computer instruction means for: storing in said memory information on a storage device and an area in said storage device used for a data writing process when a data writing process for any one of said plurality of storage devices is completed; and giving an erasing notice of data to be erased to a storage device to which data has been written, on the basis of information stored in said memory.

21. The computer program product as set forth in claim 20, wherein said computer readable program code means further comprises computer instruction means for: accepting information for specifying data to be erased; and giving an erasing notice of data to be erased to a storage device to which data has been written, on the basis of information stored in said memory according to the accepted information.

22. The computer program product as set forth in claim 20, wherein said computer readable program code means further comprises computer instruction means for giving an erasing notice for erasing read data to a storage device from which data has been read, on the basis of information stored in said memory when a data reading process from any one storage device is completed, whereby said read data is erased.

23. The computer program product as set forth in claim 19, wherein each of said plurality of storage devices further has:
an erasing accepting unit for accepting information for specifying an erasing portion of data from the outside; and
an erasing processing unit for executing a data erasing process by writing meaningless data in said erasing portion specified by the information accepted by said accepting unit.

* * * * *